US009092996B2

(12) United States Patent
Meglan et al.

(10) Patent No.: US 9,092,996 B2
(45) Date of Patent: Jul. 28, 2015

(54) MICROSURGERY SIMULATOR

(71) Applicant: SIMQUEST LLC, Silver Spring, MD (US)

(72) Inventors: Dwight A. Meglan, Westwood, MA (US); Daniel R. King, Brighton, MA (US); Albert Dvornik, Somerville, MA (US); Julien Lenoir, Somerville, MA (US)

(73) Assignee: SIMQUEST LLC, Annapolis, MD (US)

( * ) Notice: Subject to any disclaimer, the term of this patent is extended or adjusted under 35 U.S.C. 154(b) by 178 days.

(21) Appl. No.: 13/782,403

(22) Filed: Mar. 1, 2013

(65) Prior Publication Data

US 2013/0230837 A1    Sep. 5, 2013

Related U.S. Application Data

(60) Provisional application No. 61/605,405, filed on Mar. 1, 2012.

(51) Int. Cl.
*G09B 7/04* (2006.01)
*G09B 23/28* (2006.01)

(52) U.S. Cl.
CPC ...................... *G09B 23/28* (2013.01)

(58) Field of Classification Search
CPC .................................................... G06F 19/345
USPC ....................................................... 434/262
See application file for complete search history.

(56) References Cited

U.S. PATENT DOCUMENTS

| | | | | |
|---|---|---|---|---|
| 5,766,016 | A * | 6/1998 | Sinclair et al. | 434/262 |
| 5,949,388 | A * | 9/1999 | Atsumi et al. | 345/8 |
| 2009/0263775 | A1 * | 10/2009 | Ullrich | 434/267 |
| 2010/0041004 | A1 | 2/2010 | Meglan et al. | |
| 2010/0178644 | A1 | 7/2010 | Meglan et al. | |
| 2010/0248200 | A1 * | 9/2010 | Ladak et al. | 434/262 |
| 2012/0045742 | A1 | 2/2012 | Meglan et al. | |
| 2012/0220992 | A1 * | 8/2012 | Bruno et al. | 606/13 |
| 2013/0230837 | A1 * | 9/2013 | Meglan et al. | 434/262 |

* cited by examiner

*Primary Examiner* — Robert J Utama
*Assistant Examiner* — Elroy S Crocker
(74) *Attorney, Agent, or Firm* — Pillsbury Winthrop Shaw Pittman, LLP

(57) ABSTRACT

A microsurgery simulator simulates various microsurgical procedures (e.g., nerve reapproximation, ear drain deployment) that utilize a surgical microscope. A surrogate surgical microscope includes a mobile device and an eye piece. A physical surrogate surgical interface represents an interface between a user and a simulated surgical scenario. Sensors sense the user's manipulation of the surrogate surgical interface. A surgical simulation generator generates a real time 3D surgical simulation based on the sensed manipulation. The generator renders the real time surgical simulation into a real time computer graphics generated video representation that is displayed on a screen of the mobile device. A processor of the mobile device is configured to perform at least a portion of a computational analysis that is used to generate the real time computer graphics generated video representation.

19 Claims, 7 Drawing Sheets

MICROSURGERY SIMULATOR

CROSS REFERENCE

This application claims the benefit of priority from U.S. Provisional Application Ser. No. 61/605,405, filed Mar. 1, 2012, titled "Microsurgery Simulator," the entire contents of which are hereby incorporated by reference herein.

STATEMENT REGARDING FEDERALLY SPONSORED RESEARCH AND DEVELOPMENT

The U.S. Government has a paid-up license in this invention and the right in limited circumstances to require the patent owner to license others on reasonable terms as provided for by the terms of NIH Contract No. NIH NIDCR SBIR R43DE021641-01.

BACKGROUND OF THE INVENTION

1. Field of the Invention

The present invention relates generally to surgical simulators.

2. Description of Related Art

Learning microsurgical skills is a hands-on process that typically requires numerous hours of practice in the operating room with real patients. This approach is costly since it slows down the pace of operations, dangerous since it exposes patients to less skilled operators, limiting since only the patients with whatever maladies they might have are available for the learner to experience, and inefficient since learning can only occur when a staffed operating room, a patient, and a skilled mentor are available.

There are approaches that attempt to avoid the need for learning in the operating room. These typically fall into either the use of inanimate surrogate anatomic models, the use of cadavers, or the use of live animal models. Each has distinct disadvantages in that they: do not well represent the actual human anatomy, cannot support a variety of variations in geometry, mechanical properties, or systemic physiologic response to interaction, are often either single- or limited-time use, require specialized facilities and personnel to set up and maintain during training sessions that learners must come to, tend to be costly, and/or require experienced mentors to observe learner actions and provide feedback

SUMMARY OF EMBODIMENTS OF THE INVENTION

There are simulators available for minimally invasive surgical (MIS) skills training Key aspects of various conventional simulators in contrast to one or more embodiments of microsurgical simulators according to the present invention are that the real-life microsurgical procedures are performed with the surgeon's/clinician's neither having direct contact with the patient nor looking at the patient (they typically look at a monitor displaying an indirect view of the surgical site taken by a tool such as an endoscope or fluoroscope) and that the computational means used to model tool-tissue interaction are not designed to replicate real-life behavior to a provable objective metric compared to real life. Various conventional MIS simulators also do not operate on the small motion scale of microsurgical procedures. Finally, the software in various conventional MIS simulators is typically rigidly configured to work with only specific physical interfaces so that they cannot be reconfigured with different interfaces to meet different learning requirements and cost points.

One or more embodiments of the present invention provides a microsurgery simulator that overcomes one or more of the above-discussed limitations since learning can take place wherever it is convenient to set up the simulator, with whatever learning scenarios are available, at whatever time is convenient, and with appropriate automated evaluation of performance.

One or more embodiments of the simulator provides a means for surgeries performed under optical magnification, either by a base supported surgical microscope or head-worn lopes, to be practiced by replicating the response of tissue being acted upon by microsurgical tools held by the learner, typically one in each hand. The handles of the same tools that are used in real procedures are held and manipulated by the learner/user. These tools are connected to haptic interface devices that track the learner's positioning and orientation of the tools as well their manipulation of the tool mechanism(s) such as jaws. This information is fed into a real-time physics simulation of the interaction of the tools with appropriate computational models of the tissue at the surgical site of interest. The resulting stress/strain/deformation of the tissue is displayed to the learner and the accumulated forces and moments upon the surgical tools are sent out to the haptic devices so that the learner feels the resulting interaction they have produced in manipulating the tissue. The visual display of the tissue's response to manipulation can be presented on either a surrogate surgical microscope or a head-mounted display that approximates a pair of surgical lopes. In this way, the learner sees and feels the resulting response of the tissue to their actions with the tools. Combining this simulation with models of the specific surgical sites and means to objectively observe and assess the quality of the learner's performance of actions relative to quantitatively defined standards provides the learner with a means to experience surgical situations and receive feedback about their performance without the need for an actual operating room, patient, or skilled instructor/mentor. The simulator can optionally be combined with physical models/surrogates that approximate anatomical surfaces so that the learner can place their hands upon the model for finger-/touch-based interaction in addition to tool-based interaction. These physical models/surrogates can be observed with cameras and placed upon load sensing devices so that the learner's hand actions upon the anatomy can be measured and input into the simulation. The feel of the learner's contact with the physical anatomy is provided by the passive feel of the anatomy models which are typically built from a form of soft material, such as silicone rubber derivatives, designed to approximate the appearance and feel of human tissue. The measured hand actions upon the anatomy are fed into the simulation just like the tool-based actions. In addition, in combination with the physical anatomy option, rather than using haptic interface devices, real surgical tools being spatially tracked can be used and may decrease the cost of the hardware in the simulator. There are a number of combinations of interface technologies that can be used to create the microsurgery training system/simulator. These different interface technologies may be adapted for use with the same general computational physics simulation core software. Measurement, simulation, load feedback, and visual display may be designed to provide the learner with millimeter-scale experiences similar to what occurs in real life microsurgery procedures.

One or more embodiments provides a microsurgery simulator that includes a physical surrogate surgical microscope that represents a simulated surgical microscope. The physical surrogate surgical microscope includes an eye piece and a mobile device physically connected to the eye piece. The mobile device has a processor and a display screen. The mobile device is positioned relative to the eye piece such that the display screen is viewable through the eye piece. The simulator also includes a physical surrogate surgical interface that represents an interface between a user and a surgical scenario being simulated by the simulator. The physical surrogate surgical interface is configured to be manipulated by a user. The simulator also includes at least one sensor configured to sense a user's manipulation of the surrogate surgical interface. The simulator also includes a surgical simulation generator operatively connected to the at least one sensor and configured to generate a real time 3D surgical simulation of the surgical scenario based on the manipulation sensed by the at least one sensor. The real time 3D surgical simulation includes real time simulation state data. The surgical simulation generator is configured to render the real time simulation state data into a real time computer graphics generated video representation of the surgical simulation and provide the real time computer graphics generated video representation to the display screen. The mobile device is configured to display the real time computer graphics generated video representation on the display screen. The surgical simulation generator includes the processor of the mobile device such that the processor of the mobile device is configured to perform at least a portion of a computational analysis that is used to generate the real time computer graphics generated video representation.

According to one or more of these embodiments, the real time simulation state data includes data defining 3D positions of objects in the simulated surgical scenario. The at least a portion of the computational analysis performed by the processor of the mobile device includes rendering to produce the real time computer graphics generated video representation from the real time simulation state data.

According to one or more of these embodiments, the eye piece includes a dual-eye eye piece, and the mobile device is configured to render the real time computer graphics generated video representation in 3D as left and right real time computer graphics generated video representations that are viewable through left and right sides, respectively, of the dual-eye eye piece to provide depth of view.

According to one or more of these embodiments, the physical surrogate surgical microscope is movable relative to the physical surrogate surgical interface so as to vary in real time a viewing perspective of the simulated microscope. The physical surrogate surgical interface includes registration indicia. The mobile device includes a camera. The simulator is configured to determine in real time a viewing perspective of the physical surrogate surgical microscope relative to the surrogate surgical interface based on the camera's view of the registration indicia. The simulator is configured to render the real time computer graphics generated video representation so as to have the determined viewing perspective of the physical surrogate surgical microscope.

According to one or more of these embodiments, the processor of the mobile device is configured to determine in real time the viewing perspective of the physical surrogate surgical microscope such that the at least a portion of the computational analysis performed by the processor of the mobile device includes said determination in real time of the viewing perspective of the physical surrogate surgical microscope.

According to one or more of these embodiments, the mobile device includes at least one inertial position sensor configured to sense a change in a position of the mobile device. The simulator is configured such that while the registration indicia is not within the camera's view, the simulator uses the at least one inertial position sensor to determine in real time the viewing perspective of the physical surrogate surgical microscope.

According to one or more of these embodiments, the at least one sensor includes a video camera of the mobile device. The video camera is configured to provide to the surgical simulation generator an actual video feed of at least a portion of the surrogate surgical interface. The surgical simulation generator is configured to generate the real time 3D surgical simulation based at least in part on the actual video feed.

According to one or more of these embodiments, the surgical simulation generator includes a computer that is separate from the mobile device. The computer includes a processing unit and software programmed to generate the real time 3D surgical simulation.

According to one or more of these embodiments, the real time computer graphics generated video representation includes an augmented reality real time computer graphics generated video representation that incorporates a portion of the actual video feed.

According to one or more of these embodiments, the simulator includes a camera configured to provide to the surgical simulation generator an actual video feed of at least a portion of the surrogate surgical interface. The surgical simulation generator is configured to use the actual video feed to determine relative positions of first and second objects in the field of view of the actual video feed. The surgical simulation generator is configured to generate the real time surgical simulation based in part on the determined relative positions of the first and second objects.

According to one or more of these embodiments, the first and second objects each include registration indicia that are recorded in the actual video feed. The surgical simulation generator is configured to use recorded registration indicia in the actual video feed to determine relative positions of first and second objects.

According to one or more of these embodiments, the camera includes an IR camera. The registration indicia include IR-detectable registration indicia. The surgical simulation generator is configured to determine the relative positions of the first and second objects with sub-millimeter accuracy.

According to one or more of these embodiments, the surrogate surgical interface includes a physical patient surrogate, and the first object includes the physical patient surrogate.

According to one or more of these embodiments, the second object includes a microsurgical instrument surrogate.

According to one or more of these embodiments, the first object includes a first microsurgical instrument surrogate, and the second object includes a second microsurgical instrument surrogate.

According to one or more of these embodiments, the surrogate surgical interface includes a first microsurgical instrument surrogate mounted to a first position-tracking device that includes sensors that are configured to sense a position of the first microsurgical instrument surrogate and provide the sensed position to the surgical simulation generator. The first microsurgical instrument surrogate represents a first microsurgical instrument that is part of the surgical simulation. The surgical simulation generator is configured to generate the real time surgical simulation based in part on the sensed position of the first microsurgical instrument surrogate.

According to one or more of these embodiments, the surrogate surgical interface includes a first active haptic feedback device operatively connected to the first microsurgical instrument surrogate. The surgical simulation generator is configured to generate, as part of the surgical simulation, a first haptic feedback signal representative of a haptic response imparted on the microsurgical instrument being represented by the first microsurgical instrument surrogate. The first active haptic feedback device is configured to convert the first haptic feedback signal into an actual haptic response imparted on the first microsurgical instrument surrogate.

According to one or more of these embodiments, the surrogate surgical interface includes a second microsurgical instrument surrogate mounted to a second position-tracking device that includes sensors that are configured to sense a position of the second microsurgical surrogate and provide the sensed position to the surgical simulation generator. The second microsurgical instrument surrogate represents a second microsurgical instrument that is part of the surgical simulation. The surgical simulation generator is configured to generate the real time surgical simulation based in part on the sensed position of the second microsurgical instrument surrogate. The surrogate surgical interface includes a first active haptic feedback device operatively connected to the first microsurgical instrument surrogate. The surgical simulation generator is configured to generate, as part of the surgical simulation, a second haptic feedback signal representative of a haptic response imparted on the second microsurgical instrument being represented by the second microsurgical instrument surrogate. The second active haptic feedback device is configured to convert the second haptic feedback signal into an actual haptic response imparted on the second microsurgical instrument surrogate.

According to one or more of these embodiments, the mobile device is an off-the-shelf, self-contained hardware module. The module includes the processor and the display screen.

One or more embodiments provide a method of using such a microsurgery simulator. The method includes sensing a user's manipulation of the physical surrogate surgical interface that represents an interface between the user and a surgical scenario being simulated by the simulator. The method also includes generating a real time 3D surgical simulation of the surgical scenario based on the sensed manipulation. The real time 3D surgical simulation includes real time simulation state data. The method also includes converting the real time simulation state data into a real time computer graphics generated video representation of the surgical simulation. The method also includes displaying the real time computer graphics generated video representation on a display screen of a physical surrogate surgical microscope that represents a simulated surgical microscope. The physical surrogate surgical microscope includes an eye piece and a mobile device physically connected to the eye piece. The mobile device includes a processor and the display screen. The real time computer graphics generated video representation on the display screen is viewable through the eye piece. The processor performs at least a portion of a computational analysis that is used to generate the real time computer graphics generated video representation.

According to one or more of these embodiments, said converting is performed by the processor of the mobile device, and said at least a portion of the computational analysis includes said converting.

According to one or more of these embodiments, the physical surrogate surgical microscope is movable relative to the physical surrogate surgical interface so as to vary in real time a viewing perspective of the simulated microscope. The method further includes creating a video feed from a camera of the mobile device. A registration indicia connected to the physical surrogate surgical interface is within the video feed's field of view. The method also includes determining in real time the viewing perspective of the physical surrogate surgical microscope relative to the surrogate surgical interface based on the camera's view of the registration indicia. The converting includes rendering the real time computer graphics generated video representation so as to have the determined real time viewing perspective. The at least a portion of the computational analysis includes said determining of the viewing perspective.

These and other aspects of various embodiments of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

For a better understanding of embodiments of the present invention as well as other objects and further features thereof, reference is made to the following description which is to be used in conjunction with the accompanying drawings, where.

DETAILED DESCRIPTION OF EXEMPLARY EMBODIMENTS OF THE INVENTION

Figure 1:
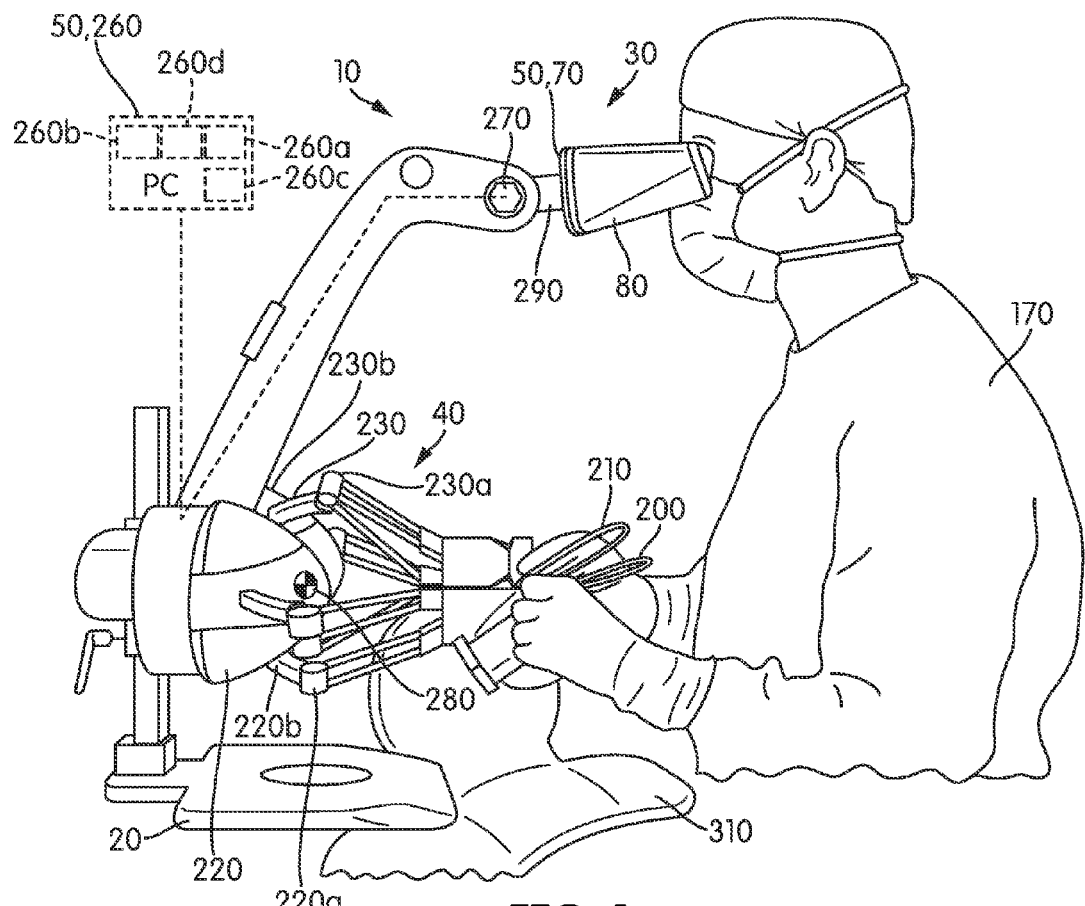
FIG. 1 is a left perspective view of a microsurgery simulator according to an embodiment of the present invention.
Figure 2:
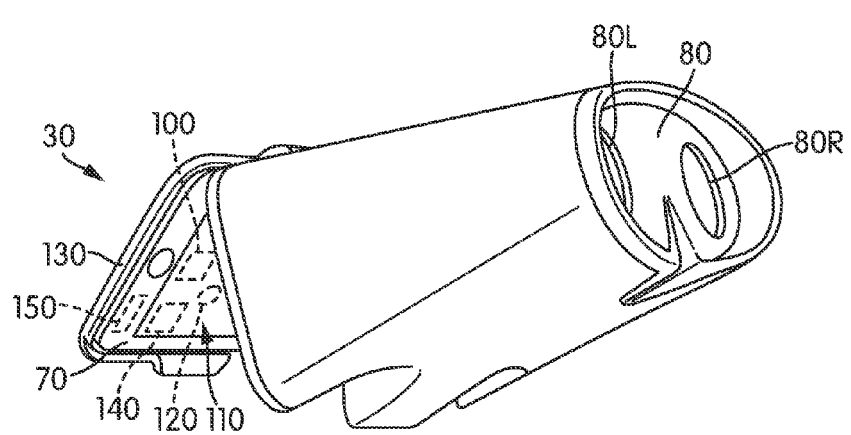
FIG. 2 is a left perspective view of a surgical microscope surrogate of the simulator of FIG. 1.
Figure 3:
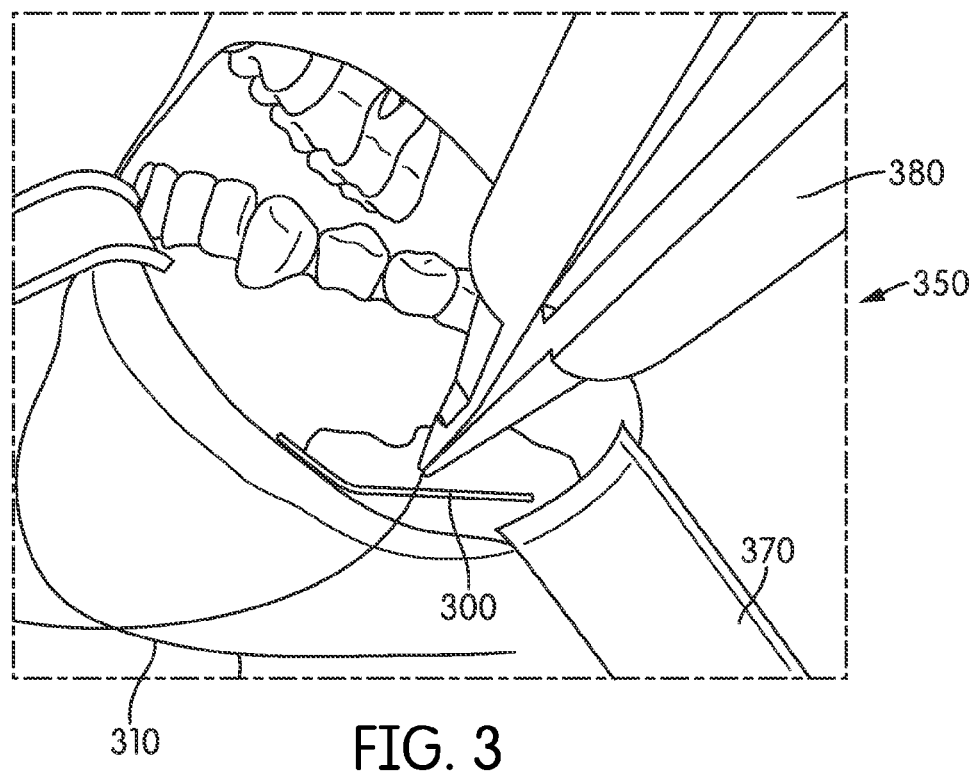
FIGS. 3 and 4 are screenshots of a real time computer graphics generated video representation of a simulation created by the simulator of FIG. 1.
Figure 4:
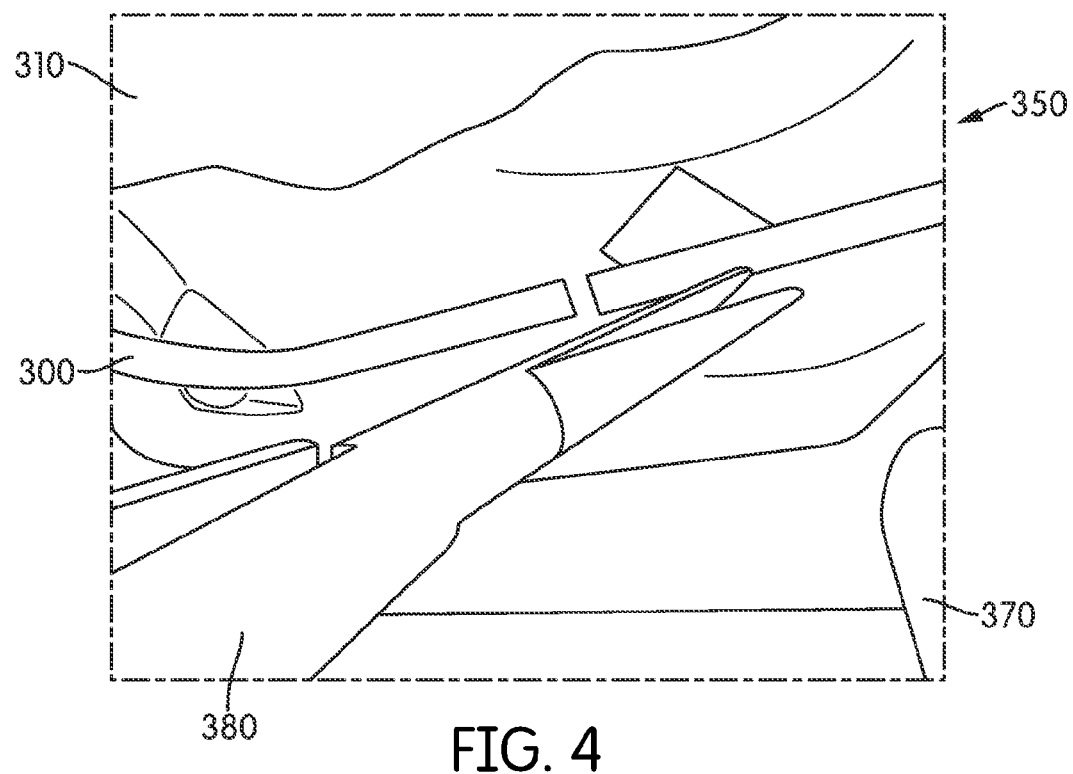

FIGS. 1-5 illustrate a microsurgery simulator 10 according to an embodiment of the present invention that simulates the microsurgical reapproximation (i.e., reconnection) of a severed inferior alveolar nerve 300 (shown in FIGS. 3 and 4). The simulator 10 comprises a base 20, a physical surrogate surgical microscope 30 movably supported by the base 20, a physical surrogate surgical interface 40 supported by the base 20, and a surgical simulation generator 50.

As shown in FIGS. 1 and 2, the physical surrogate surgical microscope 30 represents a simulated surgical microscope. The physical surrogate surgical microscope 30 comprises a mobile device 70 physically connected to an eye piece 80. The surrogate microscope 30 pivotally mounts to the base 20 so that the microscope 30 may be manually repositioned by the user 170 and then remain in the selected position. Such repositionability simulates a real surgical microscope, which is typically movably mounted on a large boom that leaves both of the user's hands free for use in the procedure once the microscope is appropriately positioned.

As shown in FIG. 2, the mobile device 70 comprises a processor 100, a display screen 110, a rear-facing camera 120, position sensors 130, a wireless transceiver 140, and a memory device 150 (e.g., hard drive, flash drive, flash memory card (e.g., SD card)). However, according to various embodiments, the mobile device 70 may omit various of these components without deviating from the scope of the present invention.

The processor 100 may comprise any type of suitable processor (e.g., a single-core processor, a multi-core processor, a combination of multiple processors, graphics processing units).

The camera 120 operatively connects to the surgical simulation generator 50 so as to provide to the surgical simulation generator 50 with an actual video feed 135 of at least a portion of the surrogate surgical interface 40.

The wireless transceiver 140 may be any type of suitable wireless transceiver for information communication with other component(s) of the simulator 10 (e.g., wifi, Bluetooth, wireless USB, cellular data network (e.g., 3G, 4G)). However, according to various embodiments, the wireless transceiver 140 may be eliminated altogether without deviating from the scope of the present invention (e.g., through the alternative use of wired communication).

According to various embodiments, the mobile device 70 comprises an off-the-shelf, self-contained hardware module that includes the processor 100, display screen 110, rear-facing camera 120, position sensors 130, and wireless transceiver 140. For example, in the illustrated embodiment, the mobile device 70 comprises an Apple iPhone. However, according to various alternative embodiments, the mobile device 70 may comprise any other type of suitable integrated mobile device (e.g., iPod Touch, smartphone, Google Android-based device). Given the ubiquity and mass production of such off-the-shelf mobile devices and the simulator 10's ability to utilize multiple components of such a mobile device 70, the use of an off-the-shelf mobile device 70 may advantageously reduce the cost and/or complexity of the simulator 10 and/or enhance the usability of the simulator 10.

As shown in FIG. 2, the eye piece 80 comprises a dual-eye eye piece with stereoscopic left and right sides 80L, 80R (e.g., left and right openings, objectives, lenses) adapted to be viewed by the left and right eyes, respectively of the user 170. The mobile device 70 is positioned relative to the eye piece 80 such that the display screen 110 is viewable through the eye piece 80. In the illustrated embodiment, the eye piece 80 pivotally connects to the mobile device 70 for movement between an operative position (shown in FIG. 1) and an inoperative position (shown in FIG. 2). In the operative position shown in FIG. 1, the display screen 110 is viewable through the eye piece 80. In the inoperative position shown in FIG. 2, the user interface of the mobile device 70 (e.g., capacitive touch/display screen 110) is more easily accessible by a user.

In the embodiment illustrated in FIGS. 1 and 2, the eye piece 80 comprises a Hasbro MY3D Viewer, which is specifically adapted to mount to a mobile device 70 such as an iPhone and provide split-screen stereoscopic viewing of the display screen 110 of the mobile device 70. However, any other suitable eye piece 80 may alternatively be used without deviating from the scope of the present invention. For example, a real surgical microscope may be used as the eye piece, in which embodiment the mobile device 70 may be mounted to the surgical microscope at a position in which the actual surgical microscope can focus on the display screen 110. Appropriate intervening lenses may be added to facilitate the use of an actual surgical microscope.

As shown in FIG. 1, the physical surrogate surgical interface 40 represents an interface between a user 170 (e.g., learner, doctor, or other medical professional or trainee) and a surgical scenario being simulated by the simulator 10. The physical surrogate surgical interface 40 is configured to be manipulated by a user. In the illustrated simulator 10, the physical surrogate surgical interface 40 comprises microsurgical instrument surrogates 200, 210, which are mounted to position-tracking, active haptic feedback devices 220, 230, respectively. The devices 220, 230 are supported by the base 20.

The instrument surrogates 200, 210 represent simulated microsurgical instruments 370, 380 (see FIGS. 3 and 4) that are used in the surgical simulation being simulated by the simulator 10. The instrument surrogates 200, 210 preferably have the shape and feel of the user-held portions of the corresponding surgical instrument. The instrument surrogates 200, 210 may be real surgical instruments (e.g., an actual scalpel, micro needleholders, micro tweezers) of the type being simulated by the simulator 10. The instrument surrogates 200, 210 are preferably removably mounted to the devices 220, 230 to facilitate replacement of the instrument surrogates 200, 210 with alternative instrument surrogates 200, 210 that are tailored for different simulated surgical scenarios.

As used herein, the term "position" may refer to a translational position, an orientational position, or a combination of translational and orientational positions. As used herein, the term "pose" means the combination of both translational and orientational position.

As shown in FIG. 1, the devices 220, 230 each comprise position sensors 220a, 230a that are configured to sense a position (e.g., a translational position, orientational position, and/or a translational and orientational pose) of their respective instrument surrogates 200, 210 and provide a corresponding instrument surrogate 200,210 position signal 240 to the simulation generator 50. The sensors 220a, 230a may comprise any type of suitable position sensors (e.g., multiple linkages with angle encoders that can together measure the instrument surrogate 200,210 position). The devices 220, 230 preferably permit and sense 6 or more degrees of freedom of movement of the respective instrument surrogates 200, 210 (e.g., three translational degrees of freedom in an X,Y,Z reference frame and three rotational degrees of freedom about the X,Y,Z axes). Additional sensors and degrees of freedom (DOF) may be permitted and sensed depending on the specific instrument surrogate (e.g., an additional rotational DOF for a surrogate of a rotary surgical tool; an additional rotational DOF for a pliers-type surgical tool to sense a clamping position of the jaws). The devices 220, 230 (e.g., the sensors 220a, 230a thereof) operatively connect to the surgical simulation generator 50 so as to provide the sensed position signal 240 for their respective instrument surrogates 200, 210 to the surgical simulation generator 50. Thus, the position sensors 220a, 230a are configured to sense a user 170's manipulation of the surrogate surgical interface 40 (specifically the surgical instrument surrogates 200,210 thereof). The sensors 220a, 230a may additionally and/or alternatively sense forces being applied to the surrogates 200,210 by the user 170.

The devices 220, 230 also include active haptic feedback generators 220b, 230b. The devices 220, 230 (e.g., active haptic feedback generators 220b, 230b thereof) operatively connect to the surgical simulation generator 50 to convert haptic feedback signals 360 (see FIG. 5) received from the generator 50 into actual, physical haptic responses imparted on the respective surgical instrument surrogates 200, 210.

According to various embodiments, the devices 220, 230 comprise two Falcon devices made by Novint Technologies, Inc., which are commercially available multi-DOF position-sensing, haptic-feedback generating devices. To provide the type of sub-millimeter position-sensing and haptic feedback desired for a microsurgery simulator, such Falcons may be modified to increase their accuracy and precision, as well as to provide orientation sensing and torque feedback not available in the commercial version. For example, various parts of the Falcon may be replaced to improve accuracy and precision (e.g., tighter tolerance joints and higher resolution position sensors), and an orientation tracking linkage has been added. According to one or more embodiments, the position sensors 220a, 230a of the devices 220, 230 are constructed and configured to sense the translational position of their respective instrument surrogates 200,210 to $\pm 2.0$ mm, $\pm 1.0$ mm, $\pm <1.0$ mm, and/or $\pm 0.5$ mm, and/or the rotational position of their respective instrument surrogates 200,210 to $\pm 5$ degrees, $\pm 4$ degrees, $\pm 3$ degrees, $\pm 2$ degrees, $\pm 1$ degree, $\pm <0.5$ degrees, and/or $\pm <0.1$ degrees.

Examples of the types of instrument surrogates 200, 210 and position-tracking, active haptic feedback devices 220, 230 that may be used in connection with one or more embodiments are disclosed in U.S. Patent Application Publication Nos. 2010/0178644 A1 ("INTERACTIVE SIMULATION OF BIOLOGICAL TISSUE") and 2010/0041004 A1 ("SURGICAL BURR HOLE DRILLING SIMULATOR"), the entire contents of which are hereby incorporated by reference herein.

As shown in FIGS. 1-2, the surgical simulation generator 50 comprises (1) a computer 260 with a processing unit 260a and software/program 260d running thereon, and (2) the processor 100 and software running thereon. The software/program may be stored on a memory device 260b (e.g., hard drive, flash memory, etc.) of the computer 260 and/or the memory device 150 of the mobile device 70.

The computer 260 may be any type of suitable computer (e.g., a laptop computer, desktop computer, tablet, notebook, cloud-based computer using remote shared processors, etc.) and may run any suitable operating system.

The processor 260a may comprise any suitable processor for running the simulation program 260d. For example, the processor 260a may comprise the processor of a conventional personal computer, or may alternatively comprise a processor specifically built for quickly performing the numerous computations involved in the simulation. The processor 260a may include a one or more graphics processing units (GPUs). The processor 260a may include multiple cores for simultaneously processing a variety of computational threads associated with the simulation. According to one or more embodiments, the processor 260a comprises two dual-core processors using a dual SLI graphics card system as well as a dedicated GPU-based computational acceleration card. The use of multiple processing cores and/or CPUs and/or GPUS may give greater computational resolution/fidelity (graphical, temporal, etc.) to the simulation within the constraints of available computational power.

The simulation program 260d runs on the processor 260a, and may be in any suitable form (e.g., program on a hard drive, CD, DVD, network server, etc., machine-readable medium encoded with machine-executable instructions executable by the processor 260a) and format for a particular associated processor 260a (e.g., machine-readable medium for use on a processor 260a running DOS, WINDOWS, LINUX, a MAC OS, etc.). The program 260d is encoded with and designed to simulate the interaction of objects within the simulated surgical scenario.

The generator 50 may divide various computational analyses of the generator 50 between the various portions of the generator 50. The computer 260 and mobile device 70 (e.g., the processor 100, camera 120, sensors 130) are operatively connected to each other to facilitate exchange of data. For example, the computer 260 and mobile device 70 may be operatively connected to each other over a network (e.g., LAN, internet, etc.). According to one embodiment, the operative connection comprises a wireless connection between the mobile device's transceiver 140 and a wireless transceiver that is connected to or integrated into the computer 260 so as to facilitate less restrained movement of the microscope 30. Alternatively, the operative connection may comprise a wired connection (e.g., Ethernet, USB, etc.).

The computer 260 and its processing unit 260a are separate from the mobile device 70 and processor 150. However, according to alternative embodiments, the entire generator 50 may be integrated (e.g., by using the processor 100 without a separate computer 260).

The surgical simulation generator 50 operatively connects to the various sensors 220a,230a,120 to sense the manipulation by the user 170 of the physical surrogate surgical interface 40 (e.g., using the position sensors 220a,230a to detect the user's manipulation of the instrument surrogates 200,210, using the camera 120 as a sensor to sense the position of various objects in the camera's field of view (e.g., instruments, the user's hands, etc.)).

The surgical simulation generator 50 (e.g., the software 260d) is programmed/configured to generate a real time 3D surgical simulation of the surgical scenario based on the manipulation sensed by the sensors 220a,230a,120. For example, in the simulator 10, the surgical simulation generator 50 is configured to generate the real time surgical simulation based in part on the sensed position of the instrument surrogates 200,210, as sensed by the position sensors 220a, 230a.

In the simulator 10, the computer 260 generates the real time 3D surgical simulation. However, the real time 3D surgical simulation could alternatively be generated by the mobile processor 100 (depending on the computing power and speed required and available in the processor 100) or a combination of the computer 260 and processor 100 without deviating from the scope of the present invention.

The surgical simulation generator 50 may utilize any suitable type of computational analysis to create the simulation (e.g., rigid body physics-based computations, finite-element-based (FEA) computations, a combination of the two). U.S. Patent Application Publication Nos. 2010/0178644 A1 ("INTERACTIVE SIMULATION OF BIOLOGICAL TISSUE"), which is incorporated herein by reference in its entirety, describes a surgical simulation generator that uses a combination of lower fidelity physics and higher fidelity deformable body FEA computations and is suitable for use or adapted use according to one or more embodiments of the present invention.

The real time 3D surgical simulation comprises real time spatial pose and entity state data 340 (see FIG. 5) that defines an instantaneous translational and rotational position of objects (e.g., surgical instruments, the simulated patient or parts of the simulated patient, hands of the user, etc.) in the simulated surgical scenario as well as their time varying shape (including changes in topology, deformation) should the object be deformable. For example, the real time 3D surgical simulation incorporates changes to the shape of the simulated patient's tissue/flesh as it is manipulated by the user.

The surgical simulation generator 50 is configured to convert/render the real time simulation state data into a real time computer graphics generated video representation 350 (shown in FIGS. 3 and 4) of the surgical simulation and provide the real time computer graphics generated video representation 350 to the display screen 110. The mobile device 70 can be configured to display the real time computer graphics generated video representation 350 on the display screen 110.

In the simulator 10, the processor 100 performs the computer graphics rendering of the real time simulation state data 340 into the real time computer graphics generated video representation 350. Using the processor 100 to render the video may be advantageous in embodiments in which the mobile device 70 connects to the computer 260 over a limited bandwidth connection (e.g., a wireless Wifi network) because a data stream of the real time simulation state data 340 is smaller than a corresponding data stream of the real time computer graphics generated video representation 350 thereof. It may therefore be beneficial to transmit the smaller real time simulation state data 340 from the computer 260 to the mobile device 70, rather than transmitting a larger real time computer graphics generated video representation 350 from the computer 260 to the mobile device 70. It may also be advantageous to perform the video rendering on the mobile device 70 in embodiments in which the mobile device's processor 100 is adapted for video rendering. However, according to alternative embodiments, the video rendering may be performed by any other part of the generator 50 without deviating from the scope of the invention. Thus, the processor 100 receives the instantaneous state data 340 in real time from the processor 260a and converts the state data 340 in real time into the real time computer graphics generated video representation 350 at that point in time.

In the simulator 10, the mobile device 70 is configured to render the real time computer graphics generated video representation 350 in 3D (a stereoscopic view) as left and right real time computer graphics generated video representations that are viewable through left and right sides 80L, 80R, respectively, of the dual-eye eye piece 80 to provide depth of view. For example, software can be configured for use by an iPhone's processor in connection with a MY3D viewer that may be suitable for rendering the real time simulation state data 340 into a real-time 3D video representation 350 that divides the video representation 350 into left and right video representations to be displayed on left and right sides of the display screen 100 and viewed through left and right sides 80L,80R of the eye piece 80. However, according to alternative embodiments, the eye piece 80 may alternatively be adapted for non-3D use (either dual-eye or single-eye) without deviating from the scope of the present invention.

As shown in FIG. 1, the physical surrogate surgical microscope 30 is movable relative to the physical surrogate surgical interface 40 so as to vary in real time a viewing perspective 265 of the simulated microscope 30. In the illustrated embodiment, the surrogate microscope 30 is pivotally attached to the base 20 for relative pivotal movement about a pivot axis 270. The base 20, in turn, supports the surrogate surgical interface 40 to provide for relative movement between the surrogate surgical microscope 30 and the physical surrogate surgical interface 40.

As used herein, relative movement between two objects is not defined relative to a larger or absolute reference frame. Thus, movement of the surrogate surgical microscope 30 relative to the surrogate surgical interface 40 is the same as movement of the surrogate surgical interface 40 relative to the surrogate surgical microscope 30. For example, relative movement may result from movement of the surrogate surgical microscope 30 relative to the base 20 and surrogate surgical interface 40 or from movement/manipulation of the surrogate surgical interface 40 relative to the base 20 and surrogate surgical microscope 30.

The simulator 10 determines the viewing perspective 265 of the microscope surrogate 30 using the camera 120 and a registration indicia 280. The registration indicia 280 (e.g., a cross, a 2D pattern, an anatomical feature or features of a surrogate surgical interface 40 in the form of shape of a patient, any other suitable indicia) is connected to or physically incorporated into physical surrogate surgical interface 40. The simulator 10 is configured to determine in real time a viewing perspective 265 of the physical surrogate surgical microscope 30 relative to the surrogate surgical interface 40 based on the camera 120's view of the registration indicia 280. The simulator 10 is configured to render the real time computer graphics generated video representation 350 so as to have the determined viewing perspective 265 of the physical surrogate surgical microscope 30.

In the illustrated mobile device 70, the viewing direction of the camera 120 relative to a plane defined by the display screen 110 is fixed and orthogonal. In the illustrated embodiment, this results in the camera 120 naturally not being aimed at the physical surrogate surgical interface 40 or indicia 280. A mirror 290 is mounted to the mobile device 70 in front of the camera 120 to redirect the camera's view downwardly toward the physical surrogate surgical interface 40 and indicia 280.

Any suitable technique may be used to determine the position of the camera 120 relative to the indicia 280 using the camera's video feed 135 (which may comprise serial still photos at a certain frame/second (e.g., 10, 15, 30, 60 fps)) of the registration indicia 280. The simulator 10 may geometrically associate the positions of (a) the camera 120 relative to the simulated surgical microscope, (b) the position of the registration indicia 280 relative to a simulated surgical scene (e.g., relative to the simulated patient), and (c) the position of the camera 120 relative to the registration indicia 280 so as to determine the simulated viewing perspective 265.

In the simulator 10, the processor 100 of the mobile device 70 is configured to determine in real time the viewing perspective 265 of the physical surrogate surgical microscope 30. The processor 100 then renders the real time computer graphics generated video representation 350 so as to have the determined viewing perspective 265 of the physical surrogate surgical microscope 30.

During the simulated surgical procedure, portions of the user's body and/or the physical surrogate surgical interface 40 may temporarily partially or wholly obstruct the camera's view of the registration indicia 280, which temporarily prevents the simulator 10 from determining the viewing perspective 265. During a time in which the simulator 10 cannot determine the viewing perspective 265, the simulator 10 uses the mobile device's sensor(s) 130 to determine in real time the viewing perspective 265 of the physical surrogate surgical microscope 30. The position sensors 130 are configured to detect the position or change in position of the mobile device 70 and provide a corresponding position signal 292 (see FIG. 5). The position sensors 130 may comprise inertial position sensors (e.g., accelerometer(s), gyroscope(s), magnetometer (s), and/or any other suitable sensor or combination of sensors for detecting the position of the mobile device 70.

When the simulator 10 cannot detect the viewing perspective 265 from the registration indicia 280, the simulator 10 initially determines that the viewing perspective 265 matches the last viewing perspective 265 determined through use of the registration indicia 280. The simulator 10 then modifies the viewing perspective 265 based on mobile device 70 position changes sensed by the sensor(s) 130. Although the use of such sensors 130 is typically less accurate and precise than the use of the registration indicia 280, the sensors 130 provide a useful stop-gap measure of the viewing perspective 265.

When the camera 120 regains an unobstructed (or sufficiently less obstructed) view of the registration indicia 280, the simulator 10 resumes use of the registration indicia 280 and camera 120 to determine the real time viewing perspective 265. According to various embodiments, if the newly redetermined camera/indicia-based viewing perspective 265 deviates from the sensor-130-based viewing perspective 265, the simulator 10 may gradually "walk" the viewing perspective 265 back to the camera/indicia-based viewing perspective 265 so as to avoid an abrupt or disruptive viewing perspective 265 change.

The surgical simulation generator 50 is configured to generate, as part of the surgical simulation, haptic feedback signals 360 representative of a haptic response imparted on the simulated surgical instruments 370,380 being represented by the surgical instrument surrogates 200,210. The generator 50 operatively connects to the devices 220, 230 (e.g., via a wired or wireless connection) so as to provide the haptic feedback signals to the devices 220,230. The haptic feedback generators 220b, 230b of the devices 22,230 convert the haptic feedback signals 360 into actual haptic responses imparted on the respective surgical instrument surrogates 200, 210.

According to various embodiments of the invention, the real time aspect of the simulator 10 provides a simulated response to a user's manipulation of the surrogate interface 40 in the form of the real time computer graphics generated video representation and/or haptic feedback within 1 second, 0.5 seconds, 0.1 seconds, 1/30 of a second, and/or 1/60 of a second of the user's manipulation. The simulation is preferably fast enough that it provides a smooth simulation where the user experiences the reaction to his/her inputs in a perceptively real time manner.

As shown in FIGS. 1, 3, and 4, the illustrated surgical scenario of the simulator 10 simulates the reapproximation of a severed inferior alveolar nerve 300. The pose of the simulated patient 310 is depicted in FIG. 1. In the simulator 10, the patient 310 exists only in the simulation, as there is no physical surrogate of the patient 310. FIGS. 3 and 4 illustrate screen shots of the real time computer graphics generated video representation 350 as it appears on the display screen 110. The screen shots in FIGS. 3 and 4 represent either (a) the total video representation in a non-stereo video representation, or (b) just the left (or just the right) side video representation in a stereo video representation.

As shown in FIGS. 3 and 4, simulated surgical instruments 370, 380 corresponding to the instrument surrogates 200,210, respectively are simulated by the generator 50 and depicted in the real time computer graphics generated video representation 350. In the illustrated embodiment, the simulated surgical instruments comprise a nerve stabilizer 370 holding the ends of the nerve 300 in stable apposition and micro needle-holders grasping a suturing needle and thread 380. However, in other surgical scenarios, different simulated instruments may be used without deviating from the scope of the present invention (e.g., scalpel, tweezers, electrocaudery tools, etc.).

According to various embodiments, the nerve 300 is simulated as finite elements of an FEA computation that is performed by the generator 50. For example, the nerve 300 may be simulated in the same or similar manner as a blood vessel is simulated as described in U.S. Patent Application Publication No. 2010/0178644 A1 ("INTERACTIVE SIMULATION OF BIOLOGICAL TISSUE"). The nerve 300 may be simulated as varying combinations of types of finite element approaches, e.g. homogenous or heterogenous 3D solids or one of more 1D tubular elements (representing the nerve fascicles) contained within a wrapper of a membrane finite element (representing the epinerium).

The simulator 10 simulates selective magnification of the simulated microscope. The user 170 may change the magnification via a magnification input 295 (see FIG. 5). The magnification input 295 may comprise any suitable input mechanism that transmits a desired level of magnification 297 to the processor 100 or other suitable portion of the generator 50. For example, the magnification input 295 may comprise the touch screen user interface 110 of the mobile device 70, which relays a desired magnification level 297 to the processor 100, which causes the processor 100 to vary the magnification of the real time computer graphics generated video representation 350. FIG. 4 illustrates a relatively more magnified view than FIG. 3. Alternatively, a separate magnification input 295 shaped to simulate a magnification control of a surgical microscope may be used and operatively connected to the mobile device 70 to communicate to the mobile device 70 the desired magnification 297.

According to one or more embodiments, the simulator 10 may also display a real time computer graphics generated video representation 400 (see FIG. 5) of the simulation on a display screen 260c of the computer 260. The real time computer graphics generated video representation displayed on the screen 260c may be identical or substantially identical to the real time computer graphics generated video representation 350 being displayed on the screen 110. For example, the processor 100 may transmit the real time computer graphics generated video representation 350 back to the computer 260 to enable the computer 260 to display the real time computer graphics generated video representation 350 on the screen 260c. It should be noted that such video transmission may require a relatively large bandwidth connection between the mobile device 70 and the computer 260. Alternatively, the processor 100 may transmit the viewing perspective 265 to the computer 260 (e.g., in the form of a 3D ray defining the viewing perspective relative to a reference frame of the simulation). The computer 260 may then render a discrete real time computer graphics generated video representation 400 to have the viewing perspective 265.

As with the real time computer graphics generated video representation 350, the real time computer graphics generated video representation 400 may be a mono (i.e., non 3D) or stereo representation. The display screen 260c may comprise a mono or stereoscopic (3D) display screen, depending on whether the corresponding representation 400 is mono or stereo.

The display screen 260c may comprise any type of suitable display (e.g., LCD monitor(s), television(s), CRT monitor(s). In a stereo/3D embodiment, the display screen 260c may comprise two LCD monitors that provide a stereoscopic output that provides a trainer or observer with a three-dimensional simulation. The display screen 260c may provide such a stereoscopic representation 400 using any suitable mechanism (e.g., a planar wide-screen passive stereoscopic monitor (shown in FIG. 1), offset polarization of LCD displays along with offset polarized glasses on the user, color-shifted display with color-divergent glasses on the user, autostereoscopic enabled displays incorporating specialized image deflection lenses).

The simulator 10 may be configured such that a viewing perspective of video representation 400 shown on the computer's screen 260c is independent of the viewing perspective 265 of the simulated microscope. The simulator 10 may provide a pan, zoom, tilt (PZT) function that enables a trainer or other individual using the computer 260 to control the viewing perspective of the real time computer graphics generated video representation 400 shown on the screen 260c.

A trainer or other individual may use to video representation 400 shown on the screen 260c to provide feedback to the user 170.

The simulator 10, itself, may additionally assess the user's actions using objective criteria defined by the software running the simulation. The simulator 10 may record the simulation and an assessment of the user's actions, for example as a simulation data file 430 in the memory 260b of the computer 260 for later review and analysis.

Figure 5:
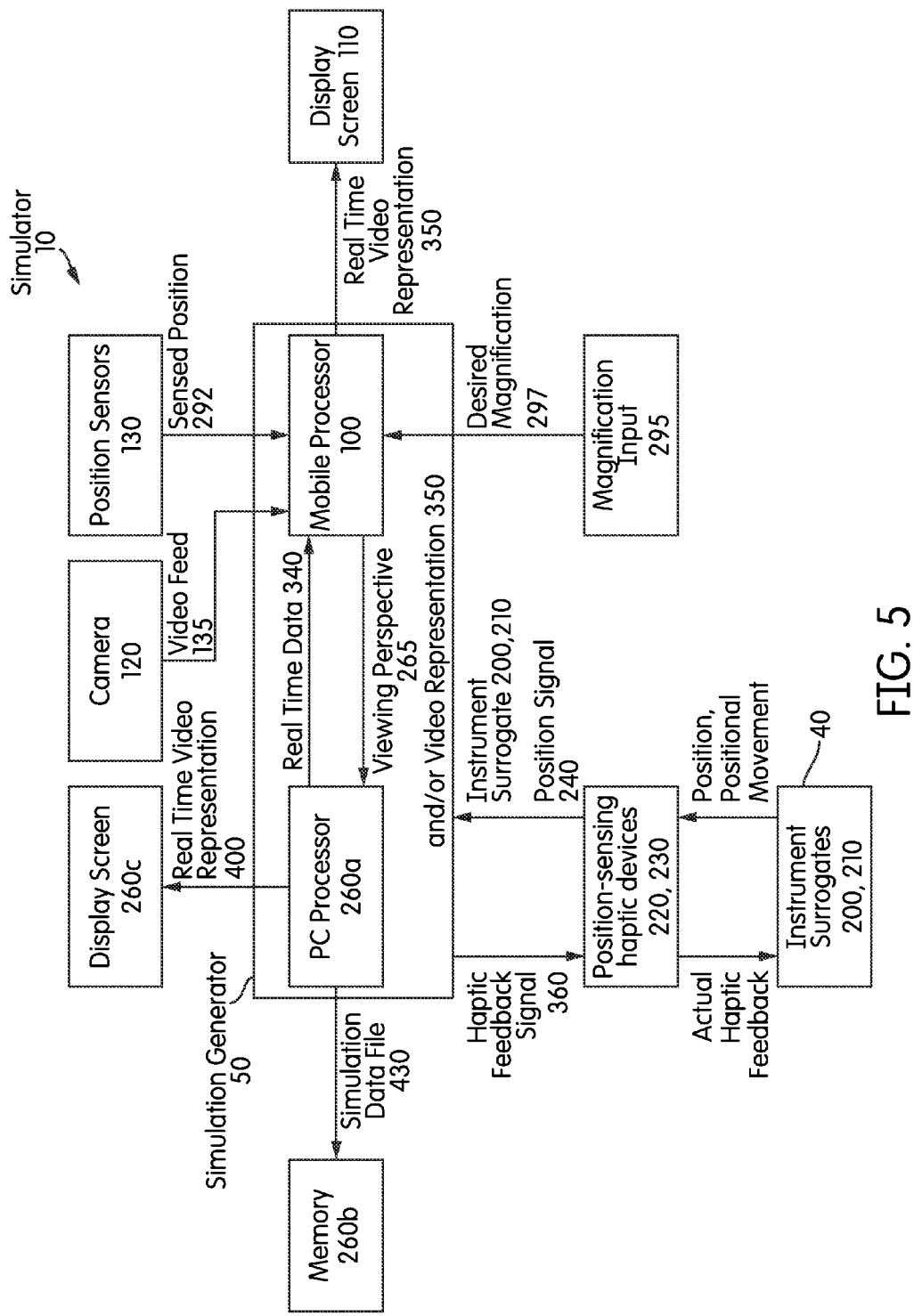
FIG. 5 is a schematic diagram showing the interrelationships between various components of the simulator of FIG. 1.

FIG. 5 provides a schematic diagram of the simulator 10 showing the interrelationship between the inputs and outputs of various components of the simulator 10. While various inputs and outputs 135, 240, 265, 292, 297, 340, 350, 360, 400, 430 are represented as being sent from certain simulator 10 components 50, 100, 120, 130, 220, 260a, 230, 295 to certain other simulator components 50, 100, 110, 220, 230, 260b, 260c, the inputs and outputs may be provided from and to any other components of the simulator 10 without deviating from the scope of the present invention. For example, the magnification signal 295 may be provided either directly or indirectly to the computer processor 260c.

Hereinafter, operation of the simulator 10 is described with reference to FIGS. 1-5. The simulation generator 50 generates the 3D simulation of the patient 310 (including a severed nerve 300) and various simulated objects such as simulated surgical instruments 370, 380. The processor 100 converts or renders the simulation into a video representation 350 (i.e., video data) that is displayed on the display 110 and viewed by the user 170 through the eye piece 80. The user 170 manipulates the instrument surrogates 200,210. The manipulation is sensed by the devices 220,230 (and/or other sensors of the simulator 10), which provide the instrument surrogate position signals 240 to the simulation generator 50. The simulation generator 50 (e.g., the processor 260a thereof) converts the sensed movement of the surrogates 200,210 into simulated movement of the corresponding simulated instruments 370,380 in the simulated surgical scene. The generator 50 uses physics based computations to determine the effect of the simulated manipulation on the patient 310, and updates the 3D simulation to account for such manipulation and its effect. For example, as the user 170 sutures the simulated nerve 300 back together, the generator 50 calculates the effect of the simulated instrument 380 on the nerve 300. The generator 50 similarly calculates the effect of the simulated instrument 370 on the simulated patient 310. The generator 50 continuously provides the updated 3D simulation to the processor 100 as real time simulation state data 340. The processor 100 continuously renders the data 340 into the video representation 350. The generator 50 also calculates a simulated haptic response on the simulated instruments 370, 380 that results from the simulated manipulation by the simulated instruments 370, 380 and provides the corresponding haptic feedback signal 360 to the active haptic feedback devices 220,230. The devices 220,230, in turn, convert the signals 360 into actual haptic feedback that the devices 220, 230 impart onto the instrument surrogates 200,210. The user 170 feels this haptic response through the surrogates 200,210.

During the simulation, the simulator 10 also displays the real time computer graphics generated video representation 400 of the simulation on the screen 260c of the computer 260 so that a trainer or other personnel can watch and analyze the user 170's actions. The simulator 10 objectively assesses the user's actions using objective criteria based on the proper actions that should be taken to accomplish the surgical goal of reapproximating the nerve 300. The simulator 10 records information relating to the simulation (e.g., the continuous 3D simulation, the real time simulation state data 340, the real time computer graphics generated video representations 350, 400, the forces imparted by one or more simulated instruments 370,780 on the patient, objective analyses of the user's performance, etc.).

While the illustrated surgical scenario of the simulator 10 simulates the reapproximation of a severed inferior alveolar nerve 300, the simulator 10 may additionally and/or alternatively comprise a variety of other surgical scenarios without deviating from the scope of the present invention (e.g., micro blood vessel anastomoses). The surgical scenarios may be stored in the memory device 260b of the computer 260 so as to be initiated as needed and run by the software of the generator 50. The instrument surrogates 200,210 may be interchanged with other suitable instrument surrogates depending on the type of surgical instrument being simulated by a particular surgical scenario.

FIGS. 6-10 illustrate a microsurgery simulator 1010 according to an alternative embodiment of the present invention. The simulator 1010 is tailored to simulate the user's use of a rapid myringotomy delivery system (RMDS) to insert an ear drain tube through the simulated patient's tympanic membrane (TM). This procedure allows a small (typically under 2 mm diameter) drain tube to be placed into the TM of the ear so that retained fluid can be removed to relieve an individual from chronic pain in the inner ear. It is a rapid alternative approach to the more invasive, more costly, and more time consuming traditional method that requires day surgery.

To avoid redundant descriptions, components of the simulator 1010 that are similar to components of the simulator 10 will generally be designated using reference numbers that are 1000 larger than the reference numbers of the corresponding components of the simulator 10. Unless otherwise stated, the corresponding components in the simulators 10,1020 may be identical to each other.

Figure 6:
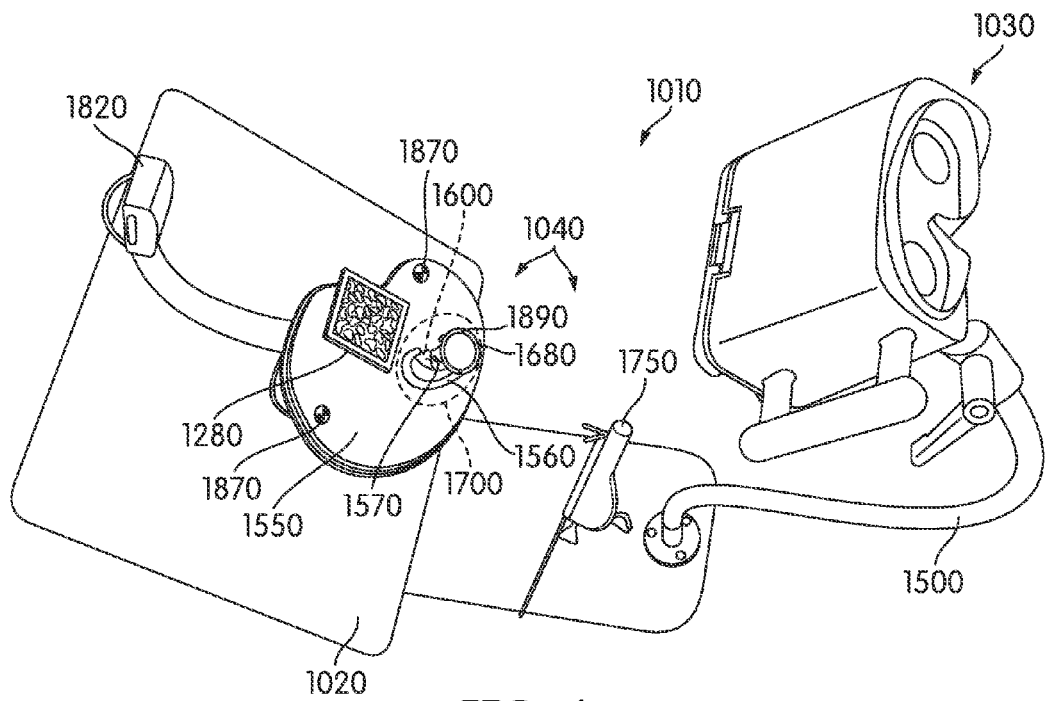
FIG. 6 is a left perspective view of a microsurgery simulator according to an alternative embodiment of the present invention.
Figure 7:
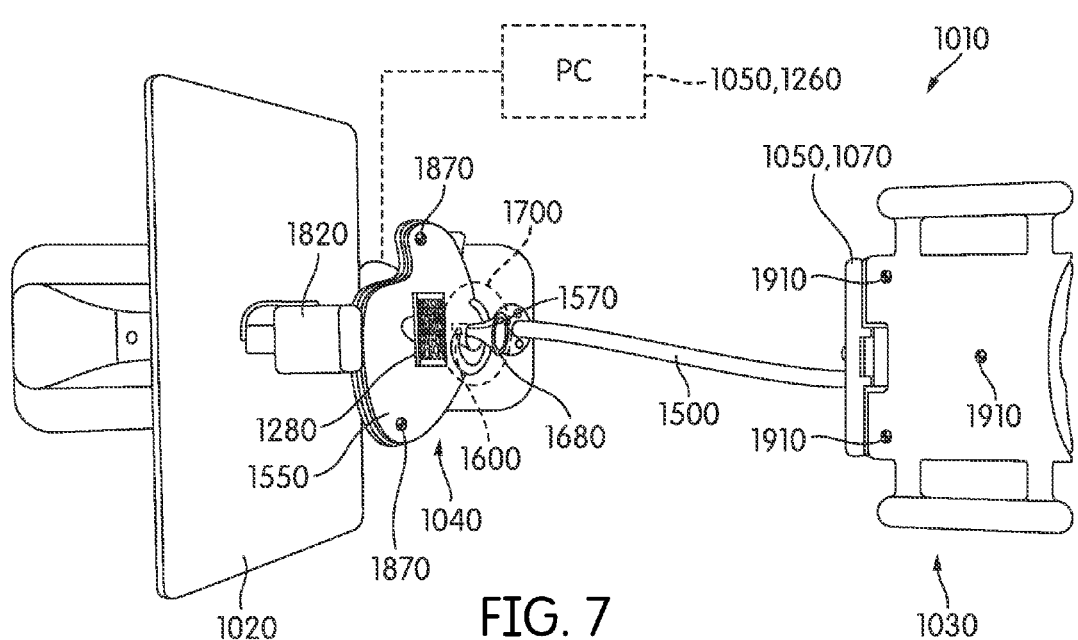
FIG. 7 is a top plan view of the simulator of FIG. 6.
Figure 8:
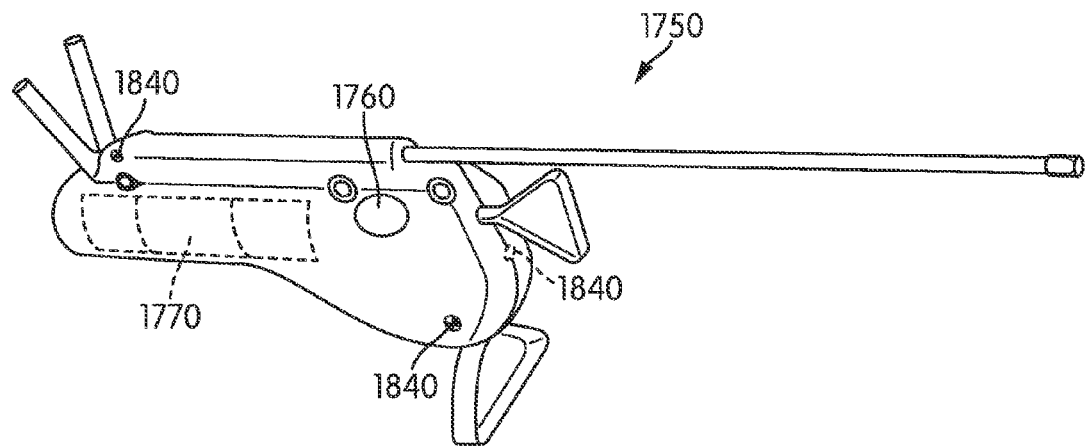
FIG. 8 is a perspective view of an RMDS device surrogate of the simulator of FIG. 6.

As shown in FIGS. 6 and 7, the microsurgery simulator 1010 comprises a base 1020, a physical surrogate surgical microscope 1030 movably supported by the base 1020, a physical surrogate surgical interface 1040 supported by the base 1020, and a surgical simulation generator 1050 (see FIG. 7).

As in the simulator 10, the surrogate surgical microscope 1030 comprises a mobile device 1070 physically connected to an eye piece 1080. The surrogate surgical microscope 1030 is movably connected to the base 1020 via a 6 degree-of-freedom connector 1500 so as to enable the user 170 to selectively vary the viewing perspective of the microscope 1030. The connector 1500 may limit the movable range of the microscope with the goal of keeping certain parts of the interface 1040 (e.g., registration indicia 1280 discussed below, the RMDS device 1750) within the field of view of the camera 1120. For example, the connector 1500 may permit the viewing perspective of the camera 1120 to deviate from straight-on viewing the ear canal 1570 (or speculum 1680) by no more than 20 degrees (e.g., a 40 degree cone of pivotal movement).

As shown in FIGS. 6 and 7, the physical surgical surgical interface 1040 comprises a physical human head surrogate 1550, a physical tympanic membrane (TM) surrogate 1600 (see FIG. 9), a surrogate speculum 1680, and a surrogate RMDS device 1750.

As shown in FIGS. 6 and 7, the physical human head surrogate 1550 comprises a physical surrogate of a portion of a human patient's head, including an ear surrogate 1560 and an ear canal 1570 that is removably mounted to the rest of the head surrogate 1550. A variety of different ear surrogates 1560 may be interchangeably attached to the rest of the head surrogate 1550 to provide different surgical scenarios (e.g., a right ear, a left ear, ears with sizes that correspond to different aged simulated patients). According to one embodiment, the ear surrogate 1560 replicates the size and shape of a 6 year old patient's ear because the ear drain procedure is commonly performed on younger children.

Different ear surrogates 1560 may comprise unique registration indicia that are viewable by the camera 1120 and enable the simulator 1010 to identify the ear surrogate 1560 from the video feed 1135. The simulator 1010 may therefore automatically adapt the 3D simulation to incorporate the type of ear and patient being simulated by the particular ear surrogate 1560.

The surrogate 1550 preferably comprises materials that provide the look and feel of an actual patient's head and ear (e.g., softer, rubber-like material to simulate the skin, harder plastic to simulate the cartilage of the ear 1560, harder material to simulate the skull). The head surrogate 1550 is movably mounted to the base 1020 to enable the user 170 to manually reposition the head surrogate 1550 so as to simulate a physician's repositioning of an actual patient's head to provide the best view and access to the simulated patient's ear. For example, the connection between the surrogate 1550 and the base 1020 may comprise a ball-and-socket type joint that enables the head surrogate 1550 to generally be pivoted in a manner that mimics a physician's ability to move a patient's head relative to the rest of the patient's body. The hemispherical backing of the head surrogate 1550 allows simple, reliable adjustment of the head 1550 and may comprise a steel hemisphere that is in contact with three planar magnet surfaces on the base 1020. The magnet surfaces may provide a strong holding force to keep the surrogate head 1550 in place, while permitting head 1550 movement with moderate effort by the user.

Figure 9:
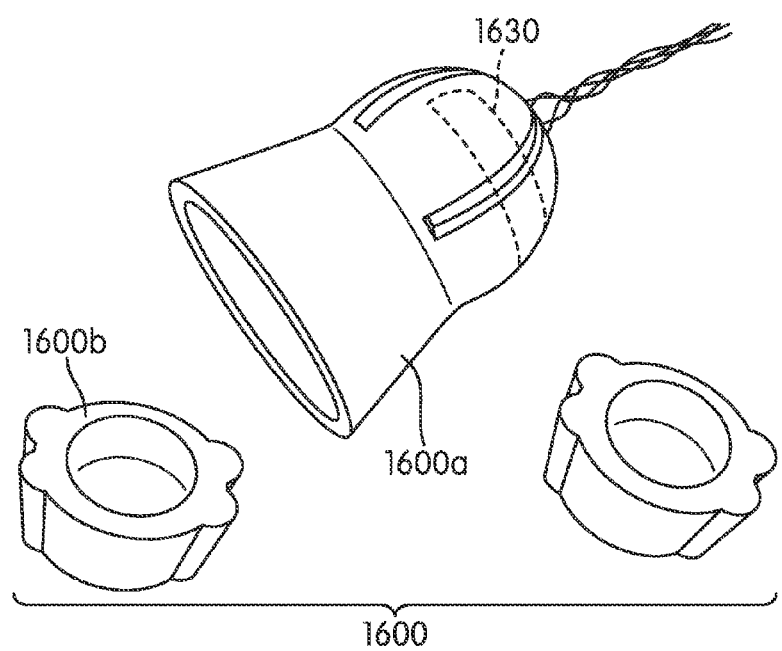
FIG. 9 is a partially disassembled perspective view of a tympanic membrane surrogate and tympanic membrane load sensor of the simulator of FIG. 6.

As shown in FIG. 9, the physical TM surrogate 1600 is replaceably positionable within the ear canal 1570. The TM surrogate 1600 includes an outer cup-shaped base 1600a and a replaceable inner membrane portion 1600b that can be press-fit within the cup-shaped base 1600a. The membrane portion 1600b preferably has the feel and give of an actual TM such that the membrane portion 1600b provides passive haptic feedback to the user through the RMDS surrogate device 1750 being pressed against the membrane portion 1600b.

In the simulator 1010, all haptic feedback is passive. However, the simulator 1010 could alternatively utilize active haptics (e.g., like described above with respect to the simulator 10) without deviating from the scope of the present invention.

A load sensor 1630 is sandwiched between the cup-shaped base 1600a and the membrane portion 1600b to sense a load/force being applied by the RMDS surrogate 1750 on the membrane portion 1600b. The load sensor 1630 operatively connects to the simulation generator 50 so as to provide a TM load signal 1640 to the generator 50. The load sensor 1630 is preferably sensitive enough to detect a load being applied by the RMDS surrogate 1750 to the membrane portion 1600b to within 20, 10, 5, 2, 1, 0.5, and/or 0.2 grams. According to various embodiments, the load sensor 1630 comprises a Honeywell FS1 (a MEMS-based sensor with high reliability and accuracy) and an A/D converter (e.g., an Arduino microcontroller).

The surrogate speculum 1680 represents a speculum of the type used by a physician to straighten a patient's ear canal so as to provide a better view of and access to the patient's TM. For simplicity, the surrogate speculum 1680 is preferably an actual ear speculum (e.g., a funnel-shaped piece of metal with a slightly bent tip). The surrogate speculum 1680 is disposed within the ear canal 1570. According to various embodiments, the surrogate speculum 1680 may be glued or permanently attached to the ear canal 1570. Accordingly to alternative embodiments, the surrogate speculum 1680 is removable so that it is inserted into the surrogate ear canal by the user. The speculum 1680 may be rotatable about the axis its funnel shape relative to the ear canal 1570 so that the user can reposition the speculum 1680 in a manner that mimics the actual procedure. The surrogate speculum 1680 and/or the ear canal 1570 to which the speculum 1680 is attached is connected to the rest of the surrogate head 1550 via a position (e.g., pose) sensor 1700 that senses a position (preferably a translational and orientational position) of the speculum surrogate 1680 relative to the surrogate head 1550. The sensor 1700 provides a corresponding speculum position signal 1720 to the simulation generator 1050. According to one or more embodiments, the position sensor 1700 comprises a SpaceNav 6DOF interface device, but may alternatively comprise any other type of suitable position sensor 1700. The SpaceNav 6DOF interface device allows a limited range of movement about a center location/pose.

The physical connection between the speculum 1690, ear canal 1570, and sensor 1700 may provide for limited movement that approximates the limited movement possible during actual use of a speculum in a patient's ear. The ear canal 1570 and sensor 1700 may be configured to provide passive haptic feedback that approximates the feel of an actual patient's ear canal. For example, the ear canal 1570 may be constructed of material that mimics the feel and give of a human patient's ear canal. According to various embodiments, the connection permits the speculum 1680 to pivot within a 20 degree cone and permit translational movement perpendicular to the ear canal's axis of several millimeters.

The RMDS surrogate 1750 represents an RMDS device, and preferably has the shape, size, and feel of an actual RMDS device. The surrogate 1750 may be an actual RMDS device that is modified for use in the simulator 1010. The surrogate 1750 includes an actuatable trigger 1760 that is used to simulate the user's triggering of the RMDS device's piercing of the TM and insertion/deployment of a drain tube.

A trigger 1760 sensor 1770 is disposed within the RMDS surrogate 1750 and senses a position of the trigger 1760 (e.g., actuated or non-actuated). According to one or more embodiments, the trigger 1760 and comprises an momentary electrical switch such that the sensor 1770 detects the trigger position by detecting whether the switch is open or closed. The sensor 1770 is configured to transmit a trigger position signal 1790 (e.g., actuated or non-actuated) to the simulation generator 1050. The connection between the sensor 1770 and the generator 1050 is preferably wireless so as to avoid having wires interfere with the free movement of the RMDS surrogate 1750. According to one or more embodiments, the sensor 1770 includes a solar cell that powers the sensor 1770 and the sensor's wireless transmitter. The illustrated sensor 1770 comprises an EnOcean wireless transmitting module configured to use Hall effect sensing for the presence of a metal portion of the actuated trigger 1760 and an associated EnOcean wireless receiver. The EnOcean module uses solar energy to scavenge power so that it can always be available. The operative connection between the sensor 1770 and the simulation generator 1050 may alternatively comprise a wired connection.

As shown in FIGS. 6 and 7, an IR camera 1820 mounts to the base 1020 (or head surrogate 1550) to detect a position of the RMDS surrogate 1750 relative to the head surrogate 1550 (and particularly the ear surrogate 1560 and TM surrogate 1600). The illustrated IR camera 1820 comprises a NaturalPoint TrackIR 6DOF tracker device, but may alternatively comprise any other type of suitable camera or position sensing device. Use of the IR camera 1820 may avoid the need for a physical/wired connection to the RMDS surrogate 1750, which may permit more natural, free movement of the RMDS surrogate 1750.

The IR camera 1820 is configured to provide to the surgical simulation generator 1050 an actual video feed 1850 of at least a portion of the surrogate surgical interface 1040. The IR camera's view may include (1) the RMDS surrogate 1750, (2) the head surrogate 1550 and the RMDS surrogate 1750, and/or (3) the head surrogate 1550, the RMDS surrogate 1750, and the speculum surrogate 1680.

The RMDS surrogate 1750 includes one or more IR reflective registration indicia 1840 (e.g., IR reflective paint, an IR LED, etc.) that are viewable by the IR camera 1820 during normal handling of the RMDS surrogate 1750 by the user. If the IR camera 1820 is rigidly connected to the head surrogate 1550, the position of the RMDS surrogate 1750 relative to the head surrogate 1550 may be determined solely by determining the position of the RMDS surrogate 1750 relative to the IR camera 1820 (given the known physical relationship between the IR camera 1820 and the head surrogate 1550).

The simulation generator 50 may use the actual video feed 1850 to determine the real time position of the RMDS surrogate 1750 in the same or similar manner as the video feed of the camera 120 is used to determine the position of the microscope surrogate 30 relative to the physical surrogate surgical interface 40. The IR camera 1820 may incorporate a processor that determines the relative positions of the objects in the video feed, in which embodiment the camera's processor would be part of the generator 1050.

According to an alternative embodiment (for example, an embodiment in which the IR camera 1820 is movable relative to the head surrogate 1550), the head surrogate 1550 may also include IR detectable registration indicia 1870 that are distinguishable from the indicia 1840 of the RMDS surrogate 1750. The simulation generator 1050 uses the IR camera's video feed 1850 to determine in real time the position of the RMDS surrogate 1750 relative to the head surrogate 1550.

As shown in FIG. 6, the speculum surrogate 1680 may include additional IR detectable registration indicia 1890 that further enable the simulation generator 1050 to determine the relative positions of (a) the RMDS surrogate 1750 and the speculum surrogate 1680, and/or (b) the head surrogate 1550 and the speculum surrogate 1680.

As shown in FIG. 7, the surrogate microscope 1030 may include additional identifiable IR detectable registration indicia 1890 that further enable the simulation generator 1050 to determine the position of the microscope surrogate 1030 relative to the RMDS surrogate 1750, speculum surrogate 1680, and/or head surrogate 1550.

While the illustrated simulator 1010 uses the actual IR video feed 1850 to determine the real time relative positions of the head surrogate 1550, the RMDS surrogate 1750, and/or the speculum surrogate 1680, the simulator 1010 may additionally and/or alternatively use the video feed 1850 to determine the real time relative positions of any other combination of objects in the field of view of the video feed 1850 (e.g., additional surgical instruments with IR detectable registration indicia). For example, if a user wears gloves with IR detectable indicia, the simulator 1010 may use the actual video feed 1850 to determine the real time position(s) of the user's hand(s) during the simulation.

While the illustrated simulator 1010 uses an IR camera 1820 to wirelessly detect the position of the surrogate RMDS device 1750, any other suitable wired (e.g., physical connection) or wireless position sensing device may alternatively be used without deviating from the scope of the present invention. For example, a wired Hydra 6 DOF electromagnetic tracker from Razer may alternatively and/or additionally be used to sense the position of the RMDS surrogate 1750.

The surgical simulation generator 1050 is configured to generate the real time 3D surgical simulation based in part on the determined relative positions of the head surrogate 1550, the RMDS surrogate 1750, and/or the speculum surrogate 1680. For example, the positions of the simulated head, RMDS device, and/or speculum in the real time 3D surgical simulation may be based on the positions of their surrogates 1550, 1750, 1680 as determined using the video feed 1850. Any suitable part of the generator 50 (e.g., the processing unit 1260a or the processor 1100) may perform the computational analysis needed to determine the real time positions of the objects (e.g., head surrogate 1550, the RMDS surrogate 1750, the speculum surrogate 1680, user hand(s)) using the video feed 1850.

The various sensors 1630, 1700, 1770, 1820 may connect to the simulation generator 1050 (e.g., the computer 1260) via any suitable interface (e.g., USB ports, serial ports, and/or parallel ports, wired or wireless connections).

According to various embodiments, the IR video feed 1850 and generator 1050 are capable of determining the relative positions of objects (e.g., head surrogate 1550, the RMDS surrogate 1750, the speculum surrogate 1680, user hand(s)) with an accuracy of less than 1 mm.

In addition to or in the alternative to the use of the IR camera 1820, the actual video feed 1135 (see FIG. 11) from the mobile device's camera 1120 may be used to detect the relative positions of objects (e.g., the head surrogate 1550, the speculum surrogate 1680, the RMDS surrogate 1750, the user's hands) in the field of view of the video feed 1135. The simulator 1050 may be configured to use the mobile device's video feed 1135 to determine relative positions of objects in the surgical scene with or without the use of dedicated registration indicia (though registration indicia such as the indicia 1280 may nonetheless be used, and may provide more accurate positional information). On the other hand, the perspective of the camera 1120 may hinder the simulator 1010's ability to determine the relative position of objects that are substantially aligned along the viewing perspective of the camera 1120 (e.g., the position of the RMDS surrogate 1750 relative to the head surrogate 1550).

Although the registration indicia 1280 illustrated in FIGS. 6 and 7 comprises a dedicated registration indicia 1280, registration indicia may alternatively comprise any other type of natural or artificial registration indicia that can be used to detect the position of the camera 1120 (and therefore the surrogate microscope 1030) relative to the head surrogate 1550. For example, the registration indicia may alternatively comprise the surrogate ear 1560 itself, in which embodiment the simulator 1010 may use the identifiable contours of the surrogate ear 1560 in the video feed 1135 to determine the camera 1120's position.

The video feed 1135 may enable the simulation generator 1050 to determine the position of the user's hand(s) (e.g., including finger articulation positions, hand shape, etc.) relative to the head surrogate 1550. The simulation generator 1050 may perform such hand detection and position determination in a manner similar to or identical to that disclosed in U.S. Patent Application Publication No. US 2012-0045742 A1 ("HEMORRHAGE CONTROL SIMULATOR"), the entire contents of which are incorporated by reference herein. The simulation generator 1050 may then generate the real time 3D surgical simulation based at least in part on the actual video feed 1135, specifically the determined hand position. For example, the simulation generator 1050 may determine from the detected hand position that the user's hand has contacted and/or otherwise manipulated the physical surrogate surgical interface 1040 (e.g., the head surrogate 1550), and consequently calculate the simulated response to such contact and/or other manipulation. Additionally and/or alternatively, the simulation generator 1050 may generate the simulation to include simulated user hands, the position of which is determined from the video feed 1135. In such an embodiment, the processor 1100 may render a visual representation of the user's hand(s) as part of the real time computer graphics generated video representation 1350 (see FIG. 11).

Additionally and/or alternatively, the simulator 1010 may comprise an augmented reality simulator that incorporates a portion of the actual video feed 1135 into the real time computer graphics generated video representation 1350. For example, in a manner similar to or identical to that described in U.S. Patent Application Publication No. US 2012-0045742 A1 ("HEMORRHAGE CONTROL SIMULATOR"), the simulator 1010 may extract the actual video feed of the user's hands (and/or other objects such as the head surrogate 1550, the RMDS device 1750, and/or the speculum surrogate 1680) and incorporate that partial video feed into the real time computer graphics generated video representation 1350.

Such computational analysis and use of the actual video feed 1135 may be performed by any suitable portion of the simulator 1010 (e.g., the simulation generator 1050, the processor 1100, the processor 260*a*). According to one or more embodiments, the computational analysis of the actual video feed 1135 is performed by the mobile processor 1100 so as to avoid transmitting high-bandwidth video data to other parts of the simulator 1010. The processor 1100 may then transmit low-bandwidth hand position data to other parts of the simulator 1010 (e.g., the processor 260*a*) to enable the simulation generator 1050 to use the hand position data to generate the real time simulation.

Registration indicia 1280 are mounted to the head surrogate 1550 to enable the mobile device's camera 1120 to determine the viewing perspective 1265 of the microscope surrogate 1030 relative to the head surrogate 1550 in the same or similar manner as described above with respect to the simulator 10.

The generator 1050 may correlate/standardize the reference frames of the various position sensors 1120, 1130, 1700, 1820 through any suitable method (e.g., via mutual detection by different sensors of an anchoring object or registration indicia (e.g., the physical ear surrogate 1560), via known physical relationships between the sensors that enables reference frame standardization, etc.). The simulator 1010 may undergo an initial calibration when the simulator 1010 is first started so as to standardize the reference frames (e.g., by putting known objects in known relative positions). Consequently, the 3D simulation generated by the generator 1050 uses a single coordinate system/frame.

The simulator 1010 uses a variety of sensors 1120, 1630, 1700, 1820 to sense a user's manipulation of the physical surrogate surgical interface 1040. However, according to one or more alternative embodiments, the camera 1120 may be the only sensor used by the simulator 1010 to sense a user's manipulation of the physical surrogate surgical interface 1040.

Figure 10:
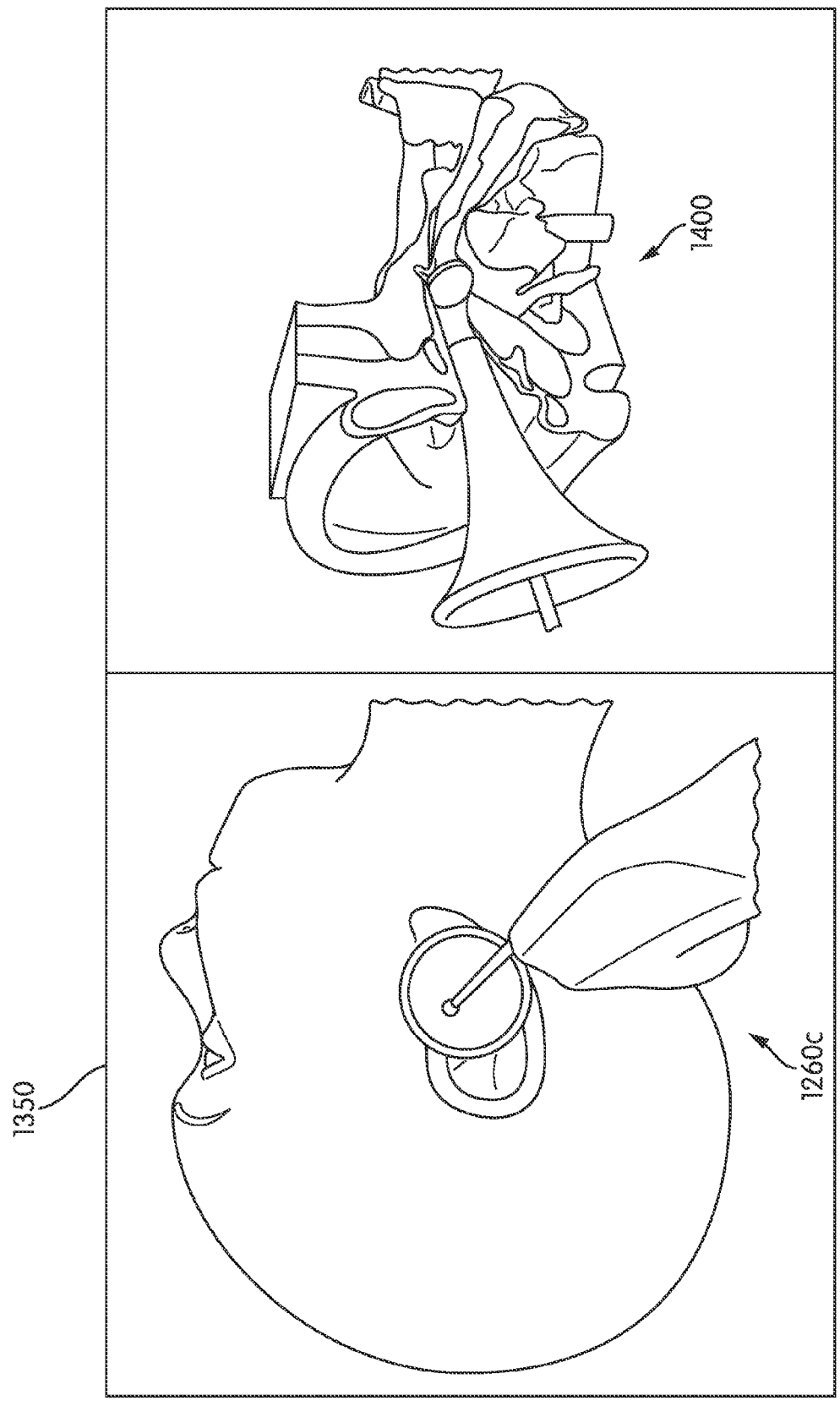
FIG. 10 is a screen shot of a real time computer graphics generated video representation of a simulation created by the simulator of FIG. 6.

FIG. 10 is a screenshot from the real-time video representation 1400 being displayed on the screen 1260*c* of the computer 1260 during operation of the simulator 1010. The left side of the screen shot illustrates the real time computer graphics generated video representation 1350 that is simultaneously being displayed on the screen 1110 of the mobile device 1070. The right side of the screen shot provides a cross-sectional real-time video representation that shows a real time cross-sectional view of the surgical simulation (e.g., bisecting the simulated ear canal).

The simulator 1010, itself, may assess the user's actions using objective criteria defined by the software running the simulation. The simulator 1010 may record the simulation and an assessment of the user's actions as a simulation data file 1430 in the memory 1260*b* of the computer 1260 for later review and analysis. One example of an objective assessment of the user's actions is the recorded amount of force that the user applied to the surrogate TM membrane 1600*b* via the surrogate RMDS 1750, as sensed by the TM load sensor 1630. The simulator 1010 may assess from the sensed force whether the required RMDS-to-TM contact has been made and assess how well the user has made that contact over the course of the ear drain deployment process. The desired contact force according to various embodiments is between 11 and 51 grams to ensure sufficient contact without damaging the TM.

Figure 11:
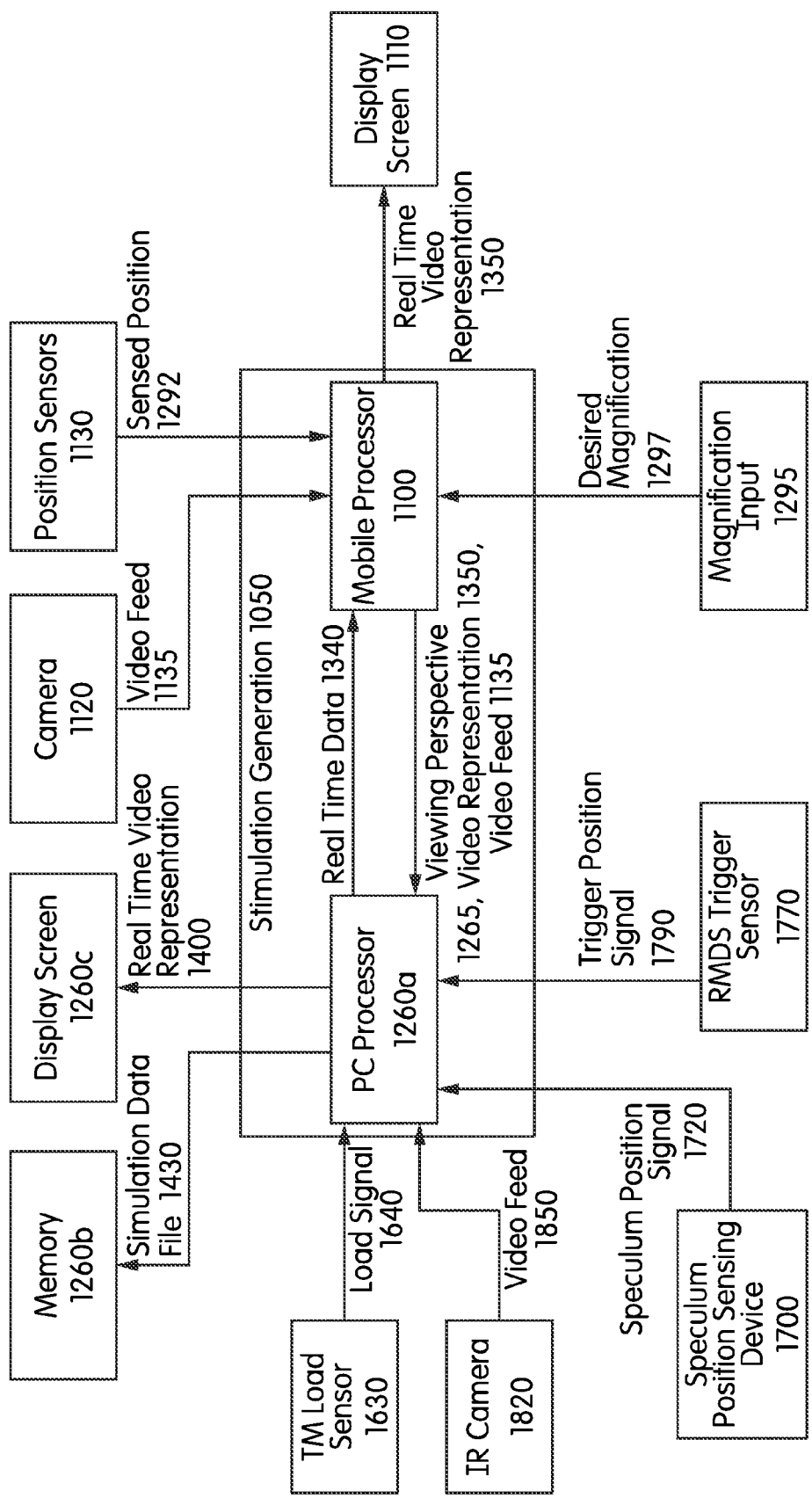
FIG. 11 is a schematic diagram showing the interrelationships between various components of the simulator of FIG. 6.

FIG. 11 is a schematic diagram of the simulator 1010 showing the interrelationship between the inputs and outputs of various simulator 1010 components (e.g., simulation generator 1050, mobile device processor 1100, mobile device display screen 1110, mobile device camera 1120, mobile device position sensors 1130, computer processor 1260*a*, computer memory 1260*b*, computer display screen 1260*c*, magnification input 1295, TM load sensor 1630, speculum position sensing device 1700, RMDS trigger sensor 1770, IR camera 1820). While various inputs and outputs (e.g., video feed 1135, viewing perspective 1265, sensed mobile device 1070 position 1292, desired magnification 1297, real time simulation data 1340, real time computer graphics generated video representation 1350, real time computer graphics generated video representation 1400, simulation data file 1430, TM load signal 1640, speculum position signal 1720, trigger position signal 1790, IR video feed 1850) are represented as being provided by certain simulator 1010 components to certain other simulator 1010 components, the inputs and outputs may be provided from and to other components of the simulator 1010 without deviating from the scope of the present invention.

Any components of the simulators 10, 1010 may be used in the other simulator 10, 1010 without deviating from the scope of the present invention. For example, the RMDS surrogate 1750 may be mounted to a position-sensing haptic feedback device like the devices 220, 230 of the simulator 10. An IR camera may be used to detect the relative positions of the instrument surrogates 210, 220 of the simulator 10.

According to an alternative embodiment of the invention, the simulator may simulate a head-worn microscope (e.g., lopes) instead of a base-mounted microscope. Such an embodiment could be very similar to the illustrated microscope surrogates 30, 1030, except that the microscope surrogate 30, 1030 is mounted to a head-mount (e.g., a hat, a set of head straps, etc.) that is worn by the user so as to position the surrogate 30, 1030 in front of the user's eyes. The user changes the microscope's viewing perspective by moving his/her head. If the microscope surrogate is simulating a fixed-magnification microscope (e.g., lopes), the magnification 297, 1297 may be fixed so as to approximate the magnification of the simulated lopes.

According to various embodiments, the processor 100, 1100 performs at least a portion of a computational analysis that is used to generate the real time computer graphics generated video representation 350, 1350 (e.g., rendering of the 3D real time computer graphics generated video representation 350, 1350 from real time simulation state data 340, 1340; determining the viewing perspective 265, 1265; determining the position of one or more physical objects being simulated (e.g., hands, instrument surrogates, etc.) for use by the generator 50, 1050 to generate the simulation; incorporating the actual video feed 135, 1135 into the real time computer graphics generated video representation 350, 1350). However, according to various alternative embodiments, various analyses being carried out by the processor 100, 1100 in the simulator 10, 1010 may alternatively be performed by other parts of the generator 1050 such as the computer 260, 1260.

According to various embodiments, the sensitivities of the computational 3D simulation, sensors, and haptic feedback are optimized to provide the simulators 10, 1010 with sub-millimeter responsiveness.

The foregoing illustrated embodiments are provided to illustrate the structural and functional principles of embodiments of the present invention and are not intended to be limiting. To the contrary, the principles of the present invention are intended to encompass any and all changes, alterations and/or substitutions within the spirit and scope of the following claims.

What is claimed is:

1. A microsurgery simulator comprising:
a physical surrogate surgical microscope that represents a simulated surgical microscope, the physical surrogate surgical microscope comprising
an eye piece, and
a mobile device physically connected to the eye piece, the mobile device having a processor and a display screen, the mobile device being positioned relative to the eye piece such that the display screen is viewable through the eye piece;
a physical surrogate surgical interface that represents an interface between a user and a surgical scenario being simulated by the simulator, the physical surrogate surgical interface being configured to be manipulated by a user;
at least one sensor configured to sense a user's manipulation of the surrogate surgical interface; and
a surgical simulation generator operatively connected to the at least one sensor and configured to generate a real time 3D surgical simulation of the surgical scenario based on the manipulation sensed by the at least one sensor, the real time 3D surgical simulation comprising real time simulation state data, the surgical simulation generator being configured to render the real time simulation state data into a real time computer graphics generated video representation of the surgical simulation and provide the real time computer graphics generated video representation to the display screen,
wherein the mobile device is configured to display the real time computer graphics generated video representation on the display screen,
wherein the surgical simulation generator comprises the processor of the mobile device such that the processor of the mobile device is configured to perform at least a portion of a computational analysis that is used to generate the real time computer graphics generated video representation.

2. The microsurgery simulator of claim 1, wherein:
the real time simulation state data comprises data defining 3D positions of objects in the simulated surgical scenario; and
the at least a portion of the computational analysis performed by the processor of the mobile device comprises rendering to produce the real time computer graphics generated video representation from the real time simulation state data.

3. The microsurgery simulator of claim 2, wherein:
the eye piece comprises a dual-eye eye piece;
the mobile device is configured to render the real time computer graphics generated video representation in 3D as left and right real time computer graphics generated video representations that are viewable through left and right sides, respectively, of the dual-eye eye piece to provide depth of view.

4. The microsurgery simulator of claim 1, wherein:
the physical surrogate surgical microscope is movable relative to the physical surrogate surgical interface so as to vary in real time a viewing perspective of the simulated microscope;
the physical surrogate surgical interface comprises registration indicia;
the mobile device comprises a camera;
the simulator is configured to determine in real time a viewing perspective of the physical surrogate surgical microscope relative to the surrogate surgical interface based on the camera's view of the registration indicia, and
the simulator is configured to render the real time computer graphics generated video representation so as to have the determined viewing perspective of the physical surrogate surgical microscope.

5. The microsurgery simulator of claim 4, wherein the processor of the mobile device is configured to determine in real time the viewing perspective of the physical surrogate surgical microscope such that the at least a portion of the computational analysis performed by the processor of the mobile device comprises said determination in real time of the viewing perspective of the physical surrogate surgical microscope.

6. The microsurgery simulator of claim 4, wherein:
the mobile device comprises at least one inertial position sensor configured to sense a change in a position of the mobile device;
the simulator is configured such that while the registration indicia is not within the camera's view, the simulator uses the at least one inertial position sensor to determine in real time the viewing perspective of the physical surrogate surgical microscope.

7. The microsurgery simulator of claim 1, wherein:
the at least one sensor comprises a video camera of the mobile device, the video camera being configured to provide to the surgical simulation generator an actual video feed of at least a portion of the surrogate surgical interface; and the surgical simulation generator is configured to generate the real time 3D surgical simulation based at least in part on the actual video feed.

8. The microsurgery simulator of claim 1, wherein:
the surgical simulation generator comprises a computer that is separate from the mobile device;
the computer includes a processing unit and software programmed to generate the real time 3D surgical simulation.

9. The microsurgery simulator of claim 7, wherein the real time computer graphics generated video representation comprises an augmented reality real time computer graphics generated video representation that incorporates a portion of the actual video feed.

10. The microsurgery simulator of claim 1, wherein:
the simulator comprises a camera configured to provide to the surgical simulation generator an actual video feed of at least a portion Of the surrogate surgical interface;
the surgical simulation generator is configured to use the actual video feed to determine relative positions of first and second objects in the field of view of the actual video feed, and
the surgical simulation generator is configured to generate the real time surgical simulation based in part on the determined relative positions of the first and second objects.

11. The microsurgery simulator of claim 10, wherein:
the first and second objects each comprise registration indicia that are recorded in the actual video feed; and
the surgical simulation generator is configured to use recorded registration indicia in the actual video feed to determine relative positions of first and second objects.

12. The microsurgery simulator of claim 10, wherein:
the camera comprises an IR camera;
the registration indicia comprise IR-detectable registration indicia; and
the surgical simulation generator is configured to determine the relative positions of the first and second objects with sub-millimeter accuracy.

13. The microsurgery simulator of claim 10, wherein:
the surrogate surgical interface comprises a physical patient surrogate, and
the first object comprises the physical patient surrogate.

14. The microsurgery simulator of claim 13, wherein the second object comprises a microsurgical instrument surrogate.

15. The microsurgery simulator of claim 10, wherein:
the first object comprises a first microsurgical instrument surrogate; and
the second object comprises a second microsurgical instrument surrogate.

16. The microsurgery simulator of claim 1, wherein:
the surrogate surgical interface comprises a first microsurgical instrument surrogate mounted to a first position-tracking device that comprises sensors that are configured to sense a position of the first microsurgical instrument surrogate and provide the sensed position to the surgical simulation generator;
the first microsurgical instrument surrogate represents a first microsurgical instrument that is part of the surgical simulation; and
the surgical simulation generator is configured to generate the real time surgical simulation based in part on the sensed position of the first microsurgical instrument surrogate.

17. The microsurgery simulator of claim 16, wherein:
the surrogate surgical interface comprises a first active haptic feedback device operatively connected to the first microsurgical instrument surrogate;
the surgical simulation generator is configured to generate, as part of the surgical simulation, a first haptic feedback signal representative of a haptic response imparted on the microsurgical instrument being represented by the first microsurgical instrument surrogate; and
the first active haptic feedback device is configured to convert the first haptic feedback signal into an actual haptic response imparted on the first microsurgical instrument surrogate.

18. The microsurgery simulator of claim 17, wherein:
the surrogate surgical interface comprises a second microsurgical instrument surrogate mounted to a second position-tracking device that comprises sensors that are configured to sense a position of the second microsurgical surrogate and provide the sensed position to the surgical simulation generator;
the second microsurgical instrument surrogate represents a second microsurgical instrument that is part of the surgical simulation;
the surgical simulation generator is configured to generate the real time surgical simulation based in part on the sensed position of the second microsurgical instrument surrogate;
the surrogate surgical interface comprises a first active haptic feedback device operatively connected to the first microsurgical instrument surrogate;
the surgical simulation generator is configured to generate, as part of the surgical simulation, a second haptic feedback signal representative of a haptic response imparted on the second microsurgical instrument being represented by the second microsurgical instrument surrogate; and
the second active haptic feedback device is configured to convert the second haptic feedback signal into an actual haptic response imparted on the second microsurgical instrument surrogate.

19. The microsurgery simulator of claim 1, wherein the mobile device comprises an off-the-shelf, self-contained hardware module, the module comprising the processor and the display screen.

* * * * *